US009771669B2

United States Patent
Kumar et al.

(10) Patent No.: US 9,771,669 B2
(45) Date of Patent: Sep. 26, 2017

(54) USE, STABILIZATION AND CARBONIZATION OF POLYACRYLONITRILE/CARBON COMPOSITE FIBERS

(71) Applicants: Satish Kumar, Atlanta, GA (US); An-Ting Chien, Atlanta, GA (US)

(72) Inventors: Satish Kumar, Atlanta, GA (US); An-Ting Chien, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 471 days.

(21) Appl. No.: 14/509,313

(22) Filed: Oct. 8, 2014

(65) Prior Publication Data

US 2016/0369426 A1    Dec. 22, 2016

Related U.S. Application Data

(60) Provisional application No. 61/901,519, filed on Nov. 8, 2013, provisional application No. 61/903,048, filed (Continued)

(51) Int. Cl.
*H05B 3/34*    (2006.01)
*D01F 9/22*    (2006.01)
(Continued)

(52) U.S. Cl.
CPC .......... *D01F 9/225* (2013.01); *B29C 47/0014* (2013.01); *D01D 5/06* (2013.01);
(Continued)

(58) Field of Classification Search
CPC ... D01F 9/225; D01F 1/02; D01F 1/10; D01F 6/54; D01F 6/18; B29C 47/0014;
(Continued)

(56) References Cited

U.S. PATENT DOCUMENTS 3,692,577 A    9/1972  Evans
4,284,615 A    8/1981  Maruyama
(Continued)

FOREIGN PATENT DOCUMENTS

CN    202117274 U    1/2012
CN    102660768 A    9/2012
(Continued)

OTHER PUBLICATIONS

International Searching Authority: "Notificataion of Transmittal of the International Search Report and the Written Opinion of the International Searching Authority, or the Declaration"; dated May 19, 2016.
(Continued)

*Primary Examiner* — Shawntina Fuqua
(74) *Attorney, Agent, or Firm* — Bryan W. Bockhop; Bockhop Intellectual Property Law, LLC

(57) ABSTRACT

In a method of making a carbon fiber, carbon nanotubes (CNT) are mixed into a solution including polyacrylonitrile (PAN) so as to form a CNT/PAN mixture. At least one PAN/CNT fiber is formed from the mixture. A first predetermined electrical current is applied to the PAN/CNT fiber until the PAN/CNT fiber is a stabilized PAN/CNT fiber. A heatable fabric that includes a plurality of fibers that each have an axis. Each of the plurality of fibers includes polyacrylonitrile and carbon nanotubes dispersed in the polyacrylonitrile in a predetermined weight percent thereof and aligned along the axes of the plurality of fibers. The plurality of fibers are woven into a fabric. A current source is configured to apply an electrical current through the plurality of fibers, thereby causing the fibers to generate heat.

14 Claims, 2 Drawing Sheets

Related U.S. Application Data on Nov. 12, 2013, provisional application No. 62/002,761, filed on May 23, 2014, provisional application No. 62/004,053, filed on May 28, 2014.

(51) Int. Cl.

| | |
|---|---|
| *B29C 47/00* | (2006.01) |
| *D01F 6/54* | (2006.01) |
| *D01D 5/06* | (2006.01) |
| *D01F 1/02* | (2006.01) |
| *H05B 3/14* | (2006.01) |
| *B29K 1/00* | (2006.01) |
| *B29K 33/20* | (2006.01) |
| *D01F 1/10* | (2006.01) |
| *D01F 6/18* | (2006.01) |

(52) U.S. Cl.
CPC ............ *D01F 1/02* (2013.01); *D01F 6/54* (2013.01); *H05B 3/14* (2013.01); *H05B 3/347* (2013.01); *B29K 2001/00* (2013.01); *B29K 2033/20* (2013.01); *D01F 1/10* (2013.01); *D01F 6/18* (2013.01); *D10B 2505/20* (2013.01); *H05B 2203/017* (2013.01); *H05B 2214/04* (2013.01)

(58) Field of Classification Search
CPC . D01D 5/06; H05B 3/14; H05B 3/347; H05B 2203/017; H05B 2214/04; B29K 2001/00; B29K 2033/20; D10B 2505/20
See application file for complete search history.

(56) References Cited

U.S. PATENT DOCUMENTS

| | | | |
|---|---|---|---|
| 5,098,688 | A | 3/1992 | Schimpf et al. |
| 6,638,883 | B2 | 10/2003 | Gaffney et al. |
| 7,354,877 | B2 | 4/2008 | Rosenberger et al. |
| 7,708,805 | B2 | 5/2010 | Heine et al. |
| 7,786,253 | B2 | 8/2010 | Paulauskas et al. |
| 7,972,536 | B2 | 7/2011 | Connell et al. |
| 8,080,487 | B2 | 12/2011 | Gardner et al. |
| 8,608,992 | B2 | 12/2013 | Chasiotis et al. |
| 2007/0031662 | A1 | 2/2007 | Devaux et al. |
| 2010/0021682 | A1 | 1/2010 | Liang et al. |
| 2010/0272978 | A1 | 10/2010 | Kumar et al. |
| 2012/0126442 | A1 | 5/2012 | Ise et al. |
| 2012/0137446 | A1 | 6/2012 | Wohlmann et al. |
| 2012/0202397 | A1 | 8/2012 | Wolf et al. |
| 2012/0214375 | A1 | 8/2012 | Kitano et al. |
| 2013/0126794 | A1 | 5/2013 | Lee et al. |
| 2013/0302605 | A1 | 11/2013 | Yang et al. |
| 2014/0091033 | A1* | 4/2014 | Kitano .............. H01M 4/625 210/505 |
| 2014/0106167 | A1 | 4/2014 | Morris et al. |

FOREIGN PATENT DOCUMENTS

| | | |
|---|---|---|
| CN | 102926020 A | 2/2013 |
| EP | 2 664 698 A1 | 11/2013 |
| JP | 2010261108 A | 11/2010 |
| WO | 01/92002 A2 | 12/2001 |
| WO | 2008/112349 A2 | 9/2008 |
| WO | WO 2013/050779 A1 | 4/2013 |

OTHER PUBLICATIONS

Chae: "Polyacrylonitrile/carbon nanotube composite fibers: reinforcement efficiency and carbonization studies"; Mar. 31, 2008; Georgia Institute of Technology.
Nataraj et al.: "Polyacrylonitrile-based nanofibers—A state-of-the-art review"; Progress in Polymer Science; Sep. 2012, vol. 37, Issue 3, pp. 487-513.
Zyga: "Power Felt' uses body heat to generate electricity"; Feb. 28, 2012; phys.org/news.
Koerner et al.: "Remotely actuated polymer nanocomposites—stress-recovery of carbonnanotube-filled thermoplastic elastomers"; Jan. 25, 2004; Nat Mater.
Karacan: "Thermal stabilization of polyacrylonitrile fibers"; 2012; Society of Plastics Engineers—Plastics Research Online.
Chae et al.: "Stabilization and carbonization of gel spun polyacrylonitrile/single wall carbon nanotube composite fibers"; Jun. 15, 2007; Polymer; vol. 48, Issue 13.
Moon et al.: "Strong electrospun nanometer-diameter polyacrylonitrile carbon fiber yarns"; Oct. 2009; Carbon; vol. 47, Issue 12; pp. 2829-2839.
Taylor: "Temperature and Strain Controlled Optimization of Stabilization of Polyacrylonitrile Precursor Fibers"; 2012; University of Kentucky.

* cited by examiner

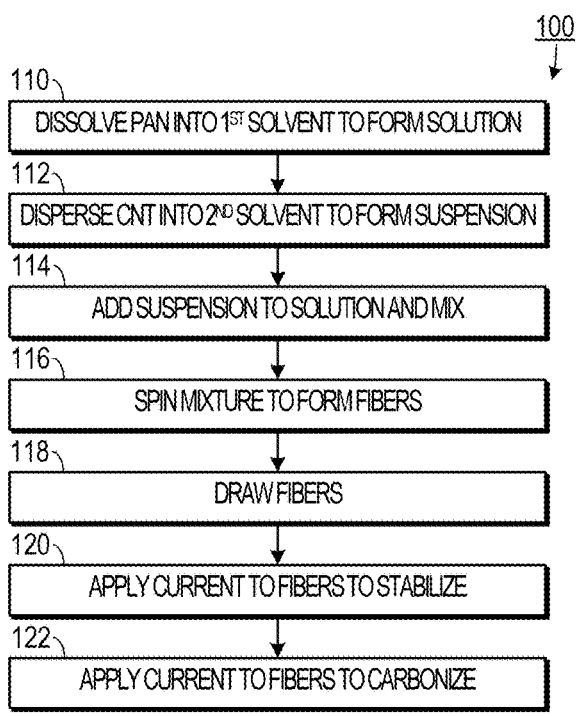
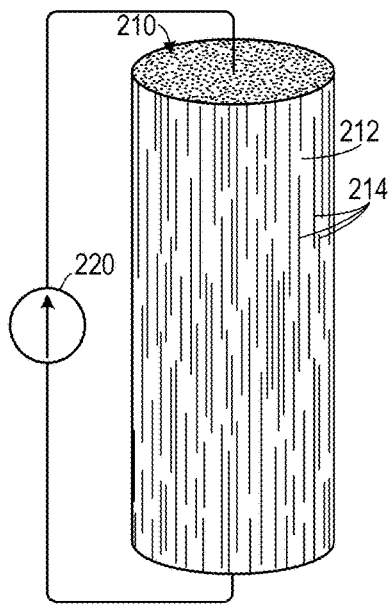
FIG. 1
FIG. 2
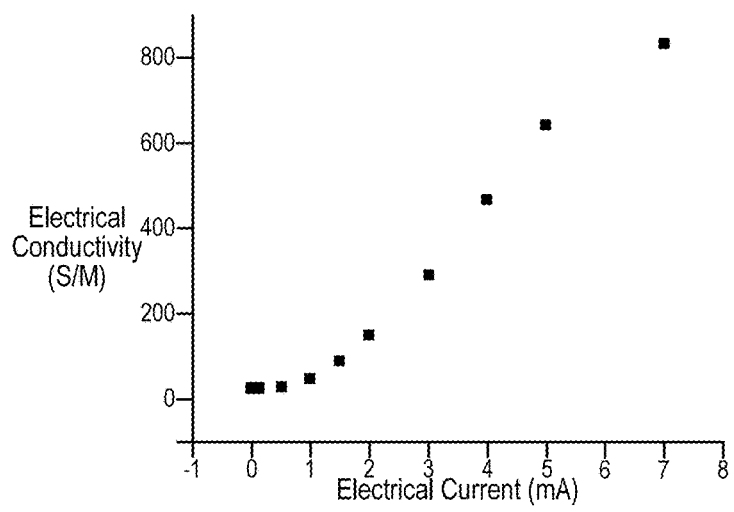
FIG. 3

USE, STABILIZATION AND CARBONIZATION OF POLYACRYLONITRILE/CARBON COMPOSITE FIBERS

CROSS-REFERENCE TO RELATED APPLICATION(S)

This application claims the benefit of U.S. Provisional Patent Application Ser. No. 61/901,519, filed Nov. 8, 2013, the entirety of which is hereby incorporated herein by reference. This application claims the benefit of U.S. Provisional Patent Application Ser. No. 61/903,048, filed Nov. 12, 2013, the entirety of which is hereby incorporated herein by reference. This application claims the benefit of U.S. Provisional Patent Application Ser. No. 62/002,761, filed May 23, 2014, the entirety of which is hereby incorporated herein by reference. This application claims the benefit of U.S. Provisional Patent Application Ser. No. 62/004,053, filed May 28, 2014, the entirety of which is hereby incorporated herein by reference.

STATEMENT OF GOVERNMENT INTEREST

This invention was made with government support under agreement No. W911NF-10-1-0098, awarded by the U.S. Army. The government has certain rights in the invention.

BACKGROUND OF THE INVENTION

1. Field of the Invention

The present invention relates to carbon and polymer fibers and, more specifically, to spun fibers that include carbon nanotubes.

2. Description of the Related Art

Carbon fibers are used in many applications, from aircraft structural components to tennis rackets, that require light weight and high strength. Most carbon fibers produced today are made from polyacrylonitrile (PAN) precursor fibers that have been stabilized and then carbonized.

PAN is a synthetic, semi-crystalline organic polymer resin, with the linear formula $(C_3H_3N)_n$. Most polyacrylonitrile resins are copolymers that include monomers with acrylonitrile as the main component. PAN is often spun into fibers, through a solution spinning process, into a precursor of high-quality carbon fiber. In fact, PAN is used as the precursor for 90% of carbon fiber production.

In one example of the spinning process, PAN powder is dissolved into an organic solvent to form a solution. The solution is spun out through orifices in a spinneret and the resulting fibers are drawn out into an environment in which they solidify as fibers.

To be used in many carbon fiber applications, the fibers must be carbonized in a process that removes non-carbon elements from the fibers. Typically, carbonization is done in an inert environment at high heat. However, the heat required to carbonize PAN fibers will usually destroy the fibers before they become carbonized. Therefore, PAN fibers need to be stabilized prior to carbonization. Stabilization is typically done in air.

Stabilization of PAN fibers results in a ladder-like structure. The stabilization process typically involves heating the fibers in a furnace, in an oxygen rich environment. Once stabilized, the fibers are subjected to a high temperature inert environment to remove non-carbon atoms, thereby forming the carbon fiber.

Existing systems typically expose the PAN fibers to heat in an oven. The stabilization process consumes considerable amounts of energy and takes a considerable amount of time—both of which add to the cost of carbon fibers. In general, fabrication of polyacrylonitrile (PAN)-based carbon fibers requires large furnaces to stabilize and carbonize precursor PAN fibers. These fibers typically go through stabilization in air in the temperature range of 180° C. to 350° C. and carbonized in inert environment between 350° C. to 1700° C. Stabilization time typically varies between 1 to 3 hours.

Also, using the oven-based method of stabilization can result in improperly stabilized fibers. Because all of the heat from the oven radiates from outside the fiber to the inside of the fiber, different levels of stabilization can exist across the cross section of the fiber: the outer shell of the fiber can be over stabilized, while the center of the fiber can be under stabilized. This can result in carbon fiber of poor quality.

Also, the electricity usage of commercial and residential buildings accounts for a considerable amount of all electricity used in the United States. If the building set temperature can be decreased in winter by 4° C. and increased in summer also by 4° C., while providing the comfort to the building occupant, then the building heating and cooling energy consumption can be decreased by 10%. This saving corresponds to more than 1% of the total energy consumed in the United State.

Therefore, there is a need for lower energy method for stabilizing PAN fibers that results in evenly stabilized fibers.

There is also a need for a fabric that can generate heat through the application of an electrical current.

SUMMARY OF THE INVENTION

The disadvantages of the prior art are overcome by the present invention which, in one aspect, is a method of making a carbon fiber in which carbon nanotubes (CNT) are mixed into a solution including polyacrylonitrile (PAN) so as to form a CNT/PAN mixture. At least one PAN/CNT fiber is formed from the mixture. A first predetermined electrical current is applied to the PAN/CNT fiber until the PAN/CNT fiber is a stabilized PAN/CNT fiber.

In another aspect, the invention is a heatable fabric that includes a plurality of fibers that each have an axis. Each of the plurality of fibers includes polyacrylonitrile and carbon nanotubes dispersed in the polyacrylonitrile in a predetermined weight percent thereof and predominantly aligned along the axes of the plurality of fibers. The plurality of fibers are woven into a fabric. A current source is configured to apply an electrical current through the plurality of fibers, thereby causing the fibers to generate heat.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

BRIEF DESCRIPTION OF THE FIGURES OF THE DRAWINGS

FIG. 1 is a flow chart showing one method of making carbonized fibers.

FIG. 2 is a schematic diagram showing electrical current being applied to a PAN/CNT fiber.

FIG. 3 is a graph relating electrical conductivity in a PAN/CNT fiber to electrical current flowing therethrough.

DETAILED DESCRIPTION OF THE INVENTION

Figure 4:
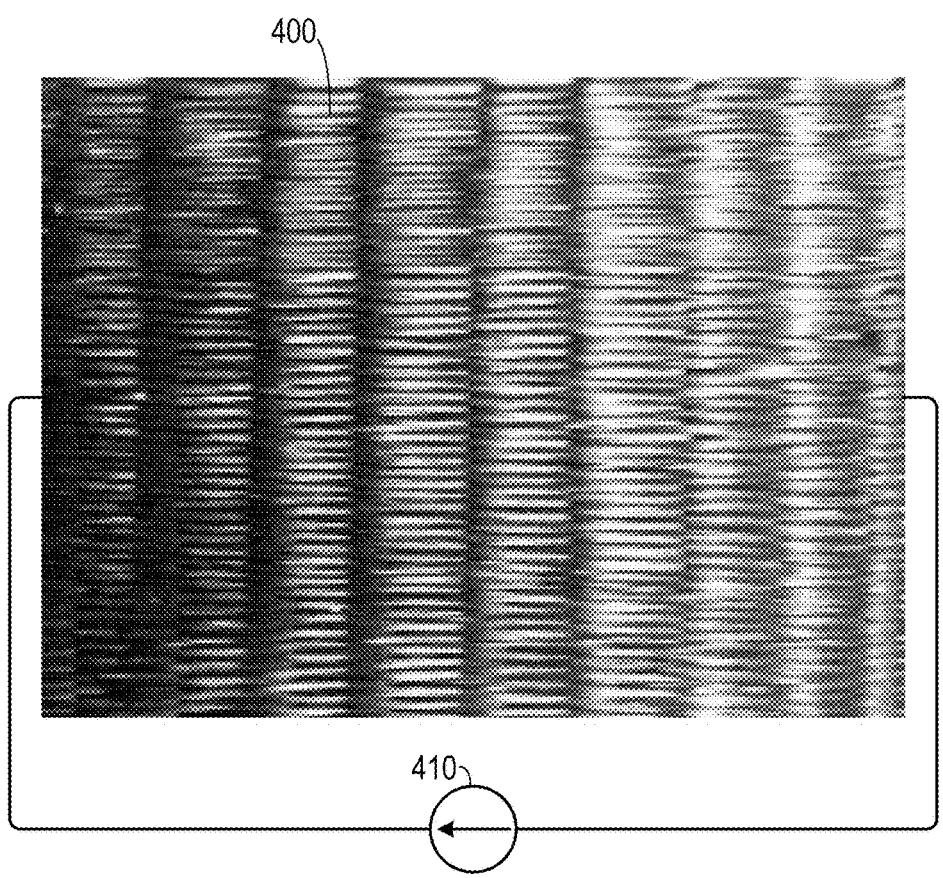
FIG. 4 is a micrograph of a fabric that includes PAN/CNT fibers.

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIG. 1, one embodiment is a method 100 for making carbon fibers in which polyacrylonitrile (PAN) is dissolved into a first solvent to form a solution 110. A plurality of carbon nanotubes (CNT) is suspended in a second solvent to form a suspension 112. The first solvent and the second solvent can include the same material. The suspension is added to the solution and the resulting combination is mixed so as to disperse the CNT into the PAN solution 114. Fibers are formed from the resulting combination 116 (for example, through a synthetic fiber spinning process—such a solution spinning or gel spinning). The fibers are drawn out 118 to a desired diameter and a first current is applied to the fibers to stabilize them 120 (i.e., to organize the molecules in the fibers into a ladder-like structure). A second current is applied to the fibers to carbonize them 122.

A schematic representation of stabilization is shown in FIG. 2, in which a fiber 210 includes a polymer matrix (for example, a PAN matrix) 212 and a plurality of predominantly aligned CNTs 214 dispersed therethrough. A current from a current source 220 is applied to stabilize the fiber 210.

In one experimental embodiment, using dry-jet-wet spin technology, polyacrylonitrile (PAN)/CNT composite fibers with 15 wt % and 20 wt % of CNT content were fabricated. Carbon Nanotube (CNT) can exhibit electrical conductivity and introduce electric current into polymer. The electrical conductivity of PAN/CNT fibers was enhanced by the annealing process at different temperatures and changed with time. These fibers could also respond to stretching, and the electrical conductivity decreased by 50% when the elongation reached 3%. In addition, electrical current can induce Joule heating effect and thermally transform PAN/CNT composite fibers. With the application of various electrical currents up to 7 mA at a fixed length, conductivity was enhanced from around 25 S/m to higher than 800 S/m, and composite fibers were stabilized in air. The temperature of composite fibers can increase from room temperature to higher than hundreds of degree Celsius measured by an infra-red (IR) microscope. The Joule heating effect can also be estimated according to one-dimensional steady-state heat transfer equation, which reveals the temperature can be high enough to stabilize or carbonize the fibers.

In the experimental embodiment, polyacrylonitrile (PAN, molecular weight: $10^5$ g/mol) with 6.7% methyl acrylate as a copolymer (obtained from Japan Exlan Co.) was dried under vacuum at 80° C. before being used. Carbon nanotubes (multi-wall carbon nanotubes) were obtained from Iljin Nanotech Co. of Korea). The PAN powder was dissolved in dimethylformamide (DMF, obtained from Sigma-Aldrich Co.) using an impeller at 90° C., and the CNT powder was dispersed in DMF using a bath sonicator (Branson, 3510-MT). The CNT/DMF dispersion was subsequently mixed with the PAN solution for fiber spinning, and the PAN/CNT composite fibers were fabricated using a dry-jet wet spinning unit (obtained from the Bradford University Research, UK) with a spinneret of 250 μm diameter and two coagulation (DMF/water) baths. The fibers were subsequently drawn in boiling water and dried in an oven at 50° C. for 7 days.

The Joule heating effect was induced by applying electrical current using a source meter unit (Keithley 2400 Sourcemeter). The fiber structure was measured by real-time wide angle x-ray equipment during Joule heating process. Wide angle X-ray diffraction (WAXD) using $CuK_\alpha$ ($\lambda=0.1542$ nm) was conducted with an x-ray generator (Rigaku Micromax-002) with 45 KV operating voltage and 0.65 mA current. Diffraction patterns were recorded by a detection system (Rigaku R-axis IV++) and analyzed by AreaMax (version 1.00), and MDI Jade (version 9.0). From the WAXD data, PAN crystallinity, PAN crystal size, and the Herman's orientation factors of the polymer and of carbon nanotubes were calculated.

The conductivity of PAN/CNT composite fibers with 15 and 20 wt % CNT content were measured by the four-point probe method. For composite fibers before the annealing process, the conductivity was around $10^{-5}$ S/m. Although CNT electrical conductivity is in the range of $10^5 \sim 10^6$ S/m and the CNT content was up to 20 wt % in these fibers, the considerable Schottky barrier between adjacent tubes may severely reduce conductivity, and the appropriate CNT orientation was required for effective CNT network. Electrical conductivity was significantly improved by using the annealing process and after annealing at 180° C. for two hours, the conductivity was as high as 4.83 S/m and 27.63 S/m for fibers with 15 and 20 wt % CNT content, respectively. Electrical conductivity increased with increase in annealing temperature.

The response of conductivity to the annealing process was observed using a power source meter and a temperature-controlled oven. Composite fibers with 20 wt % CNT content were controlled at 180° C. and 10 μA current was applied. The response of voltage in the beginning was fast. After only one minute, the applied voltage was reduced to 40% and the electrical conductivity increased to approximate 2 S/m. After two hours of annealing time, the voltage decreased by 95% and the conductivity approached 25 S/m.

In order to investigate the structure change due to annealing, composite fibers before and after being annealed for two hours at 180° C. were also observed using x-ray diffraction. The structure of PAN was changed after annealing process, and the crystallinity and crystal size of PAN polymer increased from 50 to 60% and from 5.8 to 11.8 nm, respectively. The annealing process induced a re-crystallization process of polymer chains, resulting in higher crystallinity and a larger crystal size. This induced the re-arrangement of CNT network and lowered their orientation. The re-arrangement increased the number of CNT inter-tube connections, and therefore enhanced the electrical conductivity significantly.

After the annealing process, the response of conductivity to tensile strain was measured with a stretching test. The elongation at break was ~6% and ~3% for composite fibers with 15 and 20 wt % CNT, respectively. Both fibers exhibited tensile strength higher than 130 MPa and similar tensile modulus of approximate 9 GPa. During the stretching test, the electrical conductivity was reduced when elongation was increased. The conductivity changed from 27 to 15 S/m for fibers with 20 wt % CNT at 3% elongation, and from 4.5 to 0.4 S/m for fibers with 15 wt % CNT at 6% elongation. That means only 3% elongation can reduce electrical conductivity by 50% when the composite fibers were stretched. This phenomenon is expected for the polymer/CNT composite, and the decrease is a result of breakdown in the CNT network. During the stretching process, CNTs inside polymer matrix were orientated, and higher alignment of CNTs caused lower probability of inter-tube connection. Lower CNT connection impaired the ability of transferring electrons and led to lower conductivity. The response of electrical conductivity to strain also implies that the PAN/CNT composite fibers can be utilized as sensors to interact with the surroundings when an external force is applied on the fibers.

The electrical properties were measured when the applied current was less than 0.1 mA per filament (~$6\times10^4$ A/m$^2$) at a fixed length. When the applied current was higher than 1 mA per filament though (~$6\times10^5$ A/m$^2$), the conductivity was significantly enhanced by increasing the electrical current. As shown in FIG. 3, the conductivity of annealed composite fibers with 20 wt % CNT content was ~25 S/m originally at the electrical current less than 1 mA. The electrical conductivity of fibers increased with increasing applied electrical current and reached 800 S/m at an applied current of 7 mA.

The influence of electrical power on the composite fibers was further investigated by using Fourier transform infrared spectroscopy (FT-IR). Spectra peaks at 3000~2850 cm$^{-1}$ (C—H, stretch), 2240 cm$^{-1}$ (C—N, stretch), and 1452 cm$^{-1}$ (CH$_2$, bend) decreased or disappeared in composite fibers after applying the electrical current. However, a broad peak at 1600 cm$^{-1}$ (C═C or C═N, conjugate) appeared, and so did other peaks in the fingerprint area between 1600~500 cm$^{-1}$ associated with C═C, C═N, C—O, —OH, and N—H groups for heteroatomic rings. Comparing the composite fibers after Joule heating treatment with stabilized and carbonized fibers, indicates that the composite fibers were stabilized after electrical treatment at a fixed length. When the electrical current passed through the fibers, the temperature of the composite fibers was increased by Joule heating effect. The increased temperature by the electrical power was high enough to stabilize composite fibers, and therefore composite fibers were thermally metamorphosed by the electrical current.

Wide angle x-ray diffraction (WAXD) was also used to observe the Joule heating effect on the composite fibers. When different electrical currents passed through the composite fibers with 20 wt % CNT content, two dimensional WAXD patterns were recorded in real time. These diffraction patterns show visible change of diffraction peaks at ~17° and ~30° when the applied electrical current is higher than 1 mA. These two peaks represent PAN (200, 110) and (310, 020) crystal planes. When the electrical current is higher than 1.6 mA, the diffraction peaks at ~17° and ~30° disappear and the diffraction patterns are totally different from the patterns of those original fibers. These WAXD patterns verify the suggestion from the FT-IR observation that the PAN polymer structure was gradually changed with the increasing electrical current. The electrical power induced the Joule heating effect, and the heating effect thermally metamorphosed PAN crystal structure when the fiber temperature increase by electricity was high enough to destroy PAN crystal structure and stabilized the composite fibers.

The structure was stable at low applied current, and only crystallinity and orientation of PAN polymer slightly increased. However, when the current was higher than 1 mA, the PAN crystallinity and orientation decreased. After the electrical current was increased to 1.6 mA, the crystallinity changed from 60% to 18% and the orientation factor decreased from 0.56 to 0.37. The d-spacing of 2θ~17° plane also changed from 0.525 to 0.539 and the crystal size increased from 11.8 to 16.6 nm. The above phenomena also happened to stabilized PAN fibers, while PAN crystal structure was destroyed and transformed to ladder or graphite structure during the stabilization and carbonization process.

PAN crystal structure was undergoing the thermal-transformation process as the electrical current was 1.6 mA, and one additional peak at 2θ~15° is observed. The change of WAXD patterns indicated the transformation of PAN crystal during the Joule heating process. This additional peak also suggested that the structural change may start from portion of PAN polymer region. Since electrons mainly passed through CNTs inside the polymer matrix, the Joule heating process occurred around CNTs initially, resulting in a higher temperature region around CNTs. Therefore, the thermal transformation of PAN may start in this high temperature zone next to CNTs and gradually occurs in the entire composite. The other reason is that amorphous PAN and PAN crystal with smaller crystal size may have lower thermal stability and may be transformed first, while the PAN crystal with a larger crystal size may sustain for a longer time during Joule heating. When the electrical current is higher than 3 mA, all PAN crystals are converted, and both peaks at 2θ~15° and ~17° disappear.

After the PAN structure disappeared at an electrical current higher than 3 mA, the peak around 26° became more dominant. This shows that the stabilization of composite fibers was induced by the electrical current and the PAN polymer was converted to a ladder structure. During the Joule heating process, the PAN structure was converted gradually with increased current, and the orientation factor of stabilized ladder structure was changed from 0.44 to 0.51, while the d-spacing and crystal size were almost the same at different applied currents. The electricity-induced stabilization process suggests a new energy-saving process to manufacture carbon fibers.

The electrical properties of PAN/CNT composite fibers with 20 wt % CNT were also observed to investigate the effect of fiber length on Joule heating behavior. Longer fibers require higher voltage to overcome higher electrical resistance. For example, fibers shorter than 4 mm only require voltage less than 50 V to reach electrical current of 1 mA, but fibers with a length of 76 mm require 500 V to reach electrical current of 1 mA. Because high voltage as well as high electrical power can damage the fibers, fibers with a length of 76 mm only showed the results with applied current as high as 4 mA, while the fibers broke down at 4 mA. Since the required voltage and the generated power are different for fibers with various lengths, if these fibers are applied as heating fibers, optimizing the fiber connection and weaving methods are crucial for obtaining a controllable and uniform temperature profile.

In the experimental embodiment, the electrical conductivity of PAN/CNT composite fibers was examined, and fibers with 20 wt % CNT content showed conductivity from around 25 S/m up to higher than 800 S/m. Annealing the composite fibers can re-arrange the fiber structure as well as CNT network and enhance electrical conductivity. When the composite fibers were stretched, the electrical conductivity of the fibers can be a function of elongation, and can be reduced 50% by only 3% elongation. In addition, electrical currents induced Joule heating, and thermally converted CNT/PAN composite fibers with the application of 1 to 7 mA of electrical current. The fiber temperature can gradually increase to 1000° C. As a result, an electrical current can induce the stabilization of the composite fiber in air.

In one embodiment, as shown in FIG. 4, PAN/CNT fibers can be woven into a fabric 400 that can be heated by the application of electrical current thereto from a current source 410. This embodiment relates to polymer/carbon nanotube (CNT) fibers that can provide fibers, textiles, fabrics, garments, and blankets that can be heated with the application of very small amount of electricity. These fibers are durable and provide textile quality (aesthetics, feel etc . . . ). It is estimated that the use of these fibers will allow the building temperature in winter to be set by more than 5° C. lower than the current set point temperature, while providing comfort to the occupant. It is further estimated that this will save about 0.4% of the total energy consumed in the United States today, resulting in more than one billion dollars in annual savings.

In one experimental embodiment, using gel spinning, polyacrylonitrile/carbon nanotube (PAN/CNT) composite fibers are fabricated with well-dispersed and predominantly aligned CNT along the fiber axis. CNT can not only improve mechanical properties, but also introduce electrical conductivity to the composite fibers. With CNT concentration as high as 20 wt %, the PAN/CNT fibers exhibited conductivity around 25 S/m and the conductivity can be influenced by temperature, tensile strain, and electric voltage. Therefore, we can introduce Joule heating into polymer/CNT fibers to realize active heating capability.

The joule heating effect was significant for PAN/CNT composite fibers when electrical current passing through the composite fibers. According to the estimation by Joule's law and one dimensional steady state Poisson's equation, the temperature of PAN fibers containing 20 wt % CNT can increase to more than 200° C. and close to 800° C. when an electrical current in the range of 1 to 7 mA was applied. The fiber electrical conductivity was considerably increased to almost 800 S/m when the electrical current through the fiber was increased from 1 mA to 7 mA. Moderate temperature increase in the fiber and fabric can be achieved at much lower CNT concentration and at lower current levels.

This approach can use PAN and other polymers, including: poly(propylene) (PP), poly(ethylene terephthalate) (PET), poly(ethylene) (PE), various nylons, poly(vinyl alcohol) (PVA), poly (methyl methacrylate) (PMMA), poly (ethylene oxide) (PEO), poly (ether ketone) (PEK), polycarbonate (PC), and rubber. With appropriate process design and electrical power, composite fibers materials can be heated under control, which can result in significant energy savings by creating high quality and durable fibers, fabrics, textiles, garments, and blankets with controlled heating capability.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A method of making a carbon fiber, comprising the steps of:
   (a) mixing carbon nanotubes (CNT) into a solution including polyacrylonitrile (PAN) so as to form a CNT/PAN mixture;
   (b) forming at least one PAN/CNT fiber from the mixture;
   (c) applying a first predetermined electrical current to the PAN/CNT fiber until the PAN/CNT fiber is a stabilized PAN/CNT fiber; and
   (d) applying a second predetermined electrical current to the stabilized PAN/CNT fiber until the stabilized PAN/CNT fiber is carbonized, thereby forming the carbon fiber.

2. The method of claim 1, wherein the mixing step comprises the steps of:
   (a) dissolving the PAN in a first solvent to form a solution;
   (b) dispersing the CNT in a second solvent to form a suspension; and
   (c) adding the suspension to the solution.

3. The method of claim 1, wherein the first predetermined electrical current comprises a 1 mA to 5 mA electrical current.

4. The method of claim 1, wherein the forming step comprises the step of spinning the mixture to form the fiber.

5. The method of claim 4, wherein the spinning step comprises the step of gel spinning.

6. The method of claim 1, wherein the polyacrylonitrile comprises a polymer selected from a list of polymers consisting of: a copolymer; a homopolymer; and combinations thereof.

7. The method of claim 1, wherein the PAN/CNT fiber has an axis and wherein the carbon nanotubes are predominantly aligned along the PAN/CNT fiber axis.

8. The method of claim 1, wherein the carbon nanotubes comprise up to 20 weight percent of the PAN/CNT fiber.

9. The carbon fiber of claim 1, wherein the carbon nanotubes comprise up to 20 weight percent of the fiber.

10. A heatable fabric, comprising:
   (a) a plurality of fibers each having an axis that include a polymer matrix and carbon nanotubes dispersed in the polymer matrix in a predetermined weight percent thereof and predominantly aligned along the axes of the plurality of fibers, the plurality of fibers woven into the heatable fabric; and
   (b) a current source configured to apply an electrical current through the plurality of fibers, thereby causing the fibers to generate heat.

11. The heatable fabric of claim 10, wherein the polymer matrix comprises a polymer selected from a list of polymers consisting of: polyacrylonitrile (PAN, poly(propylene) (PP), poly(ethylene terephthalate) (PET), poly(ethylene) (PE), various nylons, poly(vinyl alcohol) (PVA), poly (methyl methacrylate) (PMMA), poly (ethylene oxide) (PEO), poly (ether ketone) (PEK), polycarbonate (PC), rubber, and combinations thereof.

12. The heatable fabric of claim 10, wherein the carbon nanotubes comprise up to 20 weight percent of the plurality of fibers.

13. The heatable fabric of claim 10, wherein the polymer matrix comprises a selected one of: a PAN copolymer; a PAN homopolymer; and combinations thereof.

14. The heatable fabric of claim 10, wherein the plurality of fibers comprise carbonized fibers.

* * * * *